(12) United States Patent
Chen

(10) Patent No.: US 7,362,880 B2
(45) Date of Patent: Apr. 22, 2008

(54) UNRESOLVED TARGET DETECTION IMPROVEMENT BY USE OF MULTIPLE MATCHED FILTERS APPROACH AT DIFFERENT SPATIAL PHASES

(75) Inventor: Hai-Wen Chen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 546 days.

(21) Appl. No.: 11/094,446

(22) Filed: Mar. 31, 2005

(65) Prior Publication Data

US 2007/0036439 A1 Feb. 15, 2007

(51) Int. Cl.
*G06K 9/00* (2006.01)
*G06K 9/46* (2006.01)
*G06K 9/64* (2006.01)

(52) U.S. Cl. .................. 382/103; 382/191; 382/278

(58) Field of Classification Search ............ 382/103, 382/191, 210, 278; 375/343; 708/314; 359/561
See application file for complete search history.

(56) References Cited

U.S. PATENT DOCUMENTS

| | | | | |
|---|---|---|---|---|
| 4,470,048 A | * | 9/1984 | Short, III | 342/189 |
| 4,487,476 A | * | 12/1984 | Hester et al. | 382/211 |
| 4,760,541 A | * | 7/1988 | Weygandt et al. | 708/308 |
| 5,185,815 A | * | 2/1993 | Brandstetter | 382/211 |
| 5,862,258 A | * | 1/1999 | Taylor | 382/210 |
| 5,947,413 A | * | 9/1999 | Mahalanobis | 244/3.17 |
| 6,064,768 A | * | 5/2000 | Hajj et al. | 382/195 |
| 6,392,747 B1 | * | 5/2002 | Allen et al. | 356/141.1 |
| 6,700,490 B2 | * | 3/2004 | Frederick | 340/572.4 |
| 2003/0184468 A1 | | 10/2003 | Chen et al. | |
| 2005/0018925 A1 | * | 1/2005 | Bhagavatula et al. | 382/278 |

OTHER PUBLICATIONS

Stough et al. Focusing Attention on Objects of Interest Using Multiple Matched Filters. IEEE Transactions on Image Processing, vol. 10, No. 3, Mar. 2001, pp. 419-426.*
Drumheller et al. Target Detection Using a Linear Sum of Matched Filter Outputs. NRL Memorandum Report 8385, Jun. 30, 1999.*
Zhang et al. Algorithms for Optical Weak Small Targets Detection and Tracking: Review. IEEE Intl. Conference on Neural Networks and Signal Processing, Dec. 2003, pp. 643-647.*
Chen et al., SPIE AeroSense, Proceedings of Sensor and Data Fusion Conference, vol. 4731, pp. 204-215, Orlando, Fl, Apr. 1-5, 2002.

(Continued)

*Primary Examiner*—Colin LaRose
(74) *Attorney, Agent, or Firm*—Birch, Stewart, Kolasch & Birch, LLP

(57) ABSTRACT

A method and system for detecting a point source target using multiple matched filters are disclosed. A sensor, which is preferably an infrared focal plane array, includes a plurality of pixels for providing image data. A processor processes the image data from a selected pixel corresponding to a potential point source target and from a plurality of neighboring pixels. The system includes multiple filters having a plurality of different phases, including at least a center phase and four corner phases. The multiple filters filter the image data to obtain different filtered spatial images. A detector, which is preferably a CFAR detector, detects a target based upon the spatially filtered images from the multiple matched filters.

22 Claims, 11 Drawing Sheets

OTHER PUBLICATIONS

Chen et al., Journal of Optical Engineering, vol. 42(5), pp. 1481-1495, May 2003.

Fernandez et al., SPIE Proceedings of Signal and Data Processing of Small Targets, vol. 1481, pp. 172-179, 1991.

* cited by examiner

| DPSF OF CENTER PHASE | | |
|---|---|---|
| 0.0707 | 0.5456 | 0.0707 |
| 0.5456 | 6.7518 | 0.5456 |
| 0.0707 | 0.5456 | 0.0707 |

| DPSF OF CENTER PHASE | | |
|---|---|---|
| 1.7988 | 2.2269 | 0.0275 |
| 2.2269 | 2.7606 | 0.0307 |
| 0.0275 | 0.0307 | 0.0043 |

… (US 7,362,880 B2)

UNRESOLVED TARGET DETECTION IMPROVEMENT BY USE OF MULTIPLE MATCHED FILTERS APPROACH AT DIFFERENT SPATIAL PHASES

BACKGROUND OF THE INVENTION

1. Field of the Invention

The present invention relates generally to unresolved target detection using an infrared focal plane array and matched filters, and it more particularly relates to an unresolved target detection technique using multiple matched filters.

2. Description of the Related Art

With the advancement of IR FPA manufacturing technology, IR FPA has been broadly used for sensors in all three major platforms: airborne sensing, satellite sensing, as well as ground sensing. For example, passive IR (Infrared) sensors are widely used to detect the energy emitted from targets, backgrounds, incoming threats, and the atmosphere for a plurality of applications including military surveillance, missile target and detection systems, crop and forest management, weather forecasting, and other applications.

U.S. patent application Ser. No. 10/395,269, by Hai-Wen Chen and Teresa Olson, entitled "Integrated Spatio-Temporal Multiple Sensor Fusion System Design" provides a theoretical evaluation for different averaging processes that can reduce random noise and enhance target signatures. The inventor is a coauthor of several related papers including Hai-Wen Chen and Teresa Olson, "Integrated Spatio-Temporal Multiple Sensor Fusion System Design," *SPIE Aero-Sense, Proceedings of Sensor and Data Fusion Conference*, vol. 4731, pp. 204-215, Orlando, Fla., 1-5 Apr., 2002; Hai-Wen Chen and Teresa Olson, "Adaptive Spatiotemporal Multiple Sensor Fusion," Journal of *Optical Engineering*, vol. 42 (5), pp. 1481-1495, May, 2003.

The Matched Filter (MF) method is currently a popular approach for unresolved target detection using IR FPAs as sensor detectors. In the MF method, DPSF (discrete point spread function sampled by discrete pixels in IR FPA) is estimated from CPSF (continuous point spread function). CPSF is available based on the sensor optical and lens designs. A matched spatial filter is obtained by dividing the DPSF with the co-variance matrix of background clutter. This matched filter is optimal in an MSE (mean-square-error) sense in that it provides a maximum SCNR (signal to clutter noise ratio) for a point source (unresolved) target.

In current advanced optical designs, most energy of a DPSF can be contained within a 3×3 pixel area, and the PVF (point visibility function) can be as high as 0.6~0.75. A 0.7 PVF means that if the peak of a CPSF is located at the center of a pixel, this pixel will contain 70% of the energy of the CPSF and 30% of its energy is spread out in the neighbor pixels. Although CPSF is a symmetrical Mexican-hat shape function, the shape of a DPSF varies depending on the spatial phases. Spatial phase means the location of the CPSF peak at the sub-pixel space. If the peak is aligned with the center of a pixel, we call it a center phase. Similarly, a corner phase means that the peak falls down on a corner of a pixel. In this case, all the four pixels nearby that corner will receive equal energy from the CPSF. Therefore, it is clear that a 3×3 DPSF of a center phase has a totally different shape of energy distribution from a 3×3 DPSF of a corner phase, as evidenced in FIGS. 2(a) and (b). The PVF of the CPSF is 0.73.

Theoretically there are infinite different phases. In practice, we can approximate the infinite phases by dividing a pixel into multiple sub-pixels. For example, if we divide a pixel into 11×11 sub-pixels, then we have 121 different phases to approximate all the infinite phases. At any time moment, any sub-pixel location should have an equal probability to be aligned with the CPSF peak. That is, the spatial phase is a random variable with a uniform distribution.

From the discussion above, it is clear that the random phase causes problems in target detection using the MF method. In the traditional MF method approach, the DPSF of center phase (or averaged phase) is used to obtain the matched filter. Therefore, if the target center is located near the center of a pixel, the MF method performs well. However, if the target center is located near pixel corners or edges, the performance will be worse because the matched filter is not matched to the DPSF of the corner (or edge) phase.

Accordingly, there is a need to improve target detection of a point source target, when utilizing a matched filter and when the target center is located away from the pixel center.

SUMMARY OF THE INVENTION

The method and system of the present invention, which includes multiple matched filters, substantially overcome the previously described problem of a point source target center not being aligned with a pixel center when utilizing a matched filter. A sensor, which is preferably an infrared focal plane array, includes a plurality of pixels for providing image data. A processor processes the image data from a selected pixel corresponding to a potential point source target and from a plurality of neighboring pixels. The multiple filters have a plurality of different phases, including at least a center phase and four corner phases. The multiple filters filter the image data to obtain different filtered spatial images. The filtered spatial images are preferably normalized and averaged. The intensities of the filtered spatial images are also preferably summed. A detector, which is preferably a CFAR detector, detects a target based upon the spatially filtered images from the multiple matched filters. Preferably, either five or nine matched filters are utilized.

In the present invention, an MMF (multiple matched filters) method is described that can significantly improve detection performance for unresolved targets. Performance evaluations were conducted using images from an airborne sensor and a satellite sensor.

DETAILED DESCRIPTION OF THE INVENTION

In order to facilitate the reader's understanding of the present invention, the following list of acronyms and their general meanings are provided:
CFAR—Constant False Alarm Rate
CPSF—Continuous Point Spread Function
DPSF—Discrete Point Spread Function
FOR—Field of Regard
FOV—Field of View
FPA—Focal Plane Array
IR—Infrared
IRST—Infrared Search and Track
LOS—Line of Sight
LS—Least-Square
MF—Matched filter
MMF—Multiple Matched Filters
MFA—Multiple-Frame-Association
MSE—Mean-Square-Error
MTI—Moving Target Indicator
NEDT—Noise-Equivalent Temperature Difference
Pd—Probability of Detection
Pfa—Probability of False-Alarm
PSF—Point spread function
PVF—Point Visibility Function
ROC—Receiver Operating Characteristics
S/N—Signal-to-Noise Ratio
SCNR—Signal to Clutter Noise Ratio
STD—Spot Time-Differencing The present invention is directed to a MMF (Multiple Matched Filters) method having multiple matched filters at different spatial phases to improve detection performance. This approach applies a neighbor-fusion strategy for spatial noise reduction to increase SCNR. The phasing problem is a universal problem to different sensors using IR FPA. In addition to improving detection performance, the outputs from MMF can also be used for improving sub-pixel centroiding performance.

Figure 3:
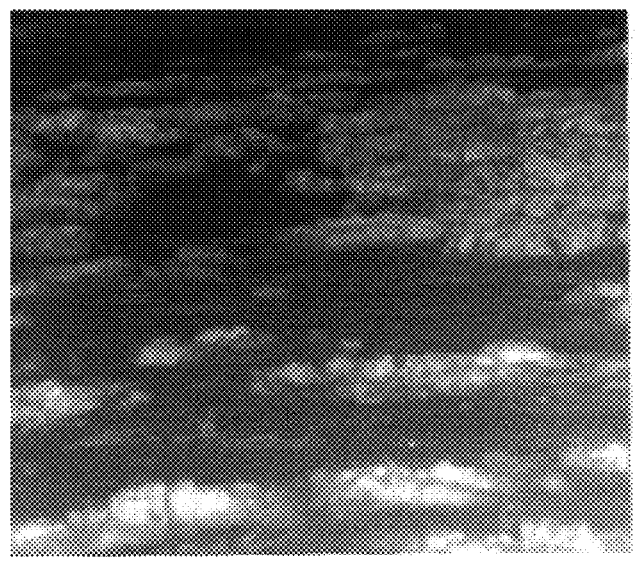
FIG. 3 is a photograph of a cloud scene that appears as a background clutter image.

The present invention has been tested with a cloud scene as the background clutter image, as shown in FIG. 3. In the preliminary testing, a point-source target was randomly inserted to the cloud background in 121 different phases. For each phase, it was randomly inserted twelve times. Accordingly, the total target insertion number was 121×12=1452.

Figure 4:
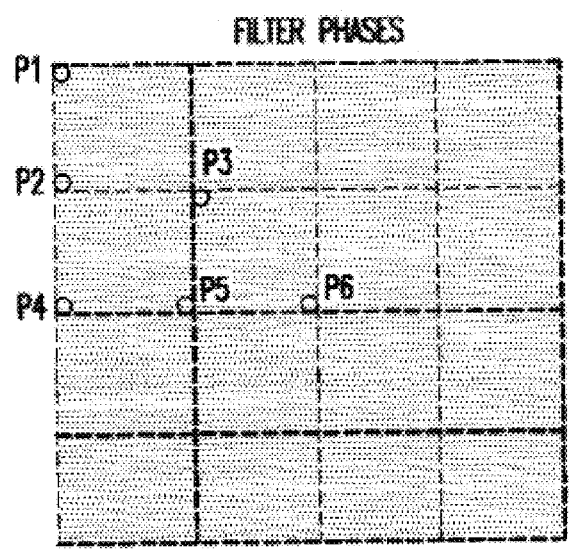
FIG. 4 is a diagram illustrating the performance of a traditional single MF method having six phases among a possible 121 phases.
Figure 5B:
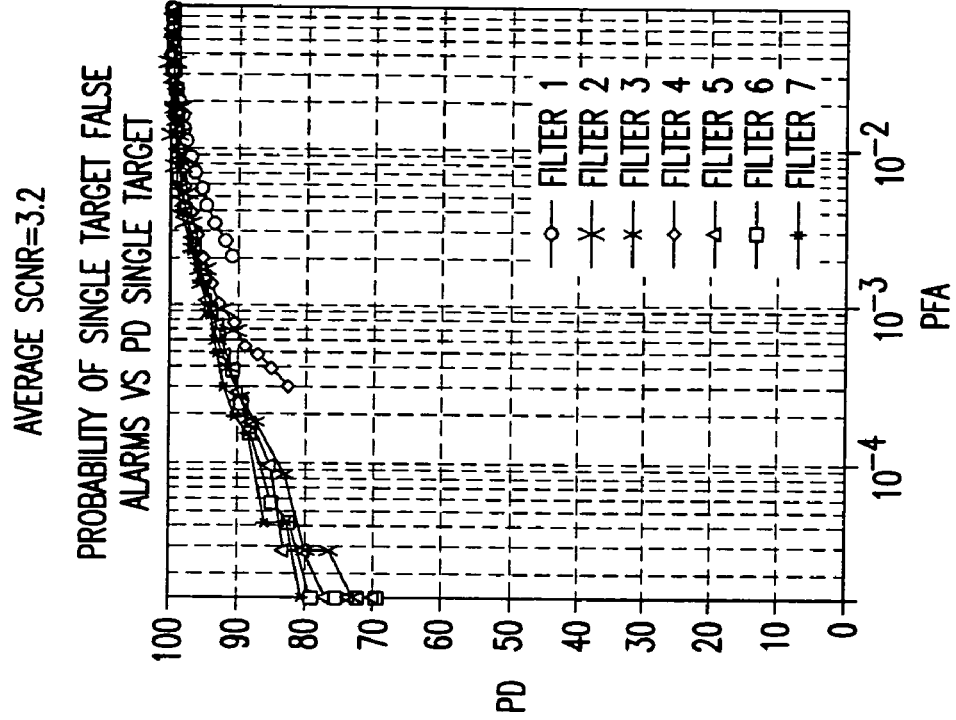
FIGS. 5A and 5B are graphs that compare the performances of seven different matched filters.
Figure 5A:
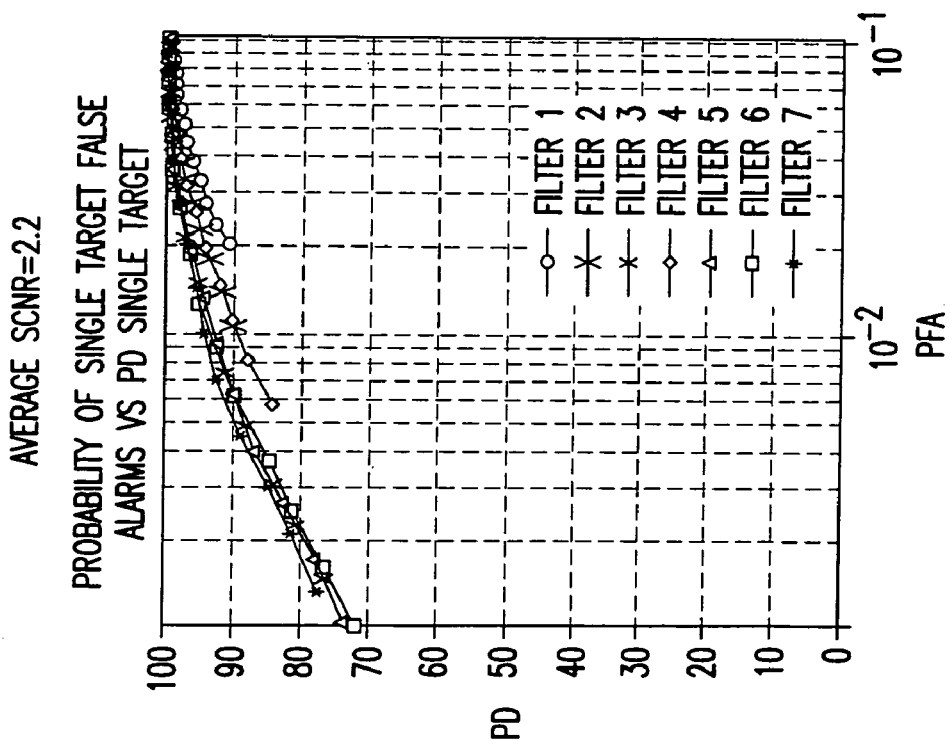

FIG. 4 illustrates the performance of a traditional single MF method having six phases among a possible 121 phases. Phase P1 is the left-upper corner phase, and phase P6 is the center phase. The traditional MF method uses a single MF. Its performance is shown in FIG. 5 at two different SCNRs. The performances of seven different matched filters were compared. MFs #1 to 6 are obtained by using different DPSFs with the six different phases shown in FIG. 4. MF #7 is obtained by using the averaged DPSF of the 121 phases. It is seen that the averaged-phase MF performs the best among the seven MFs.

Figure 6A:
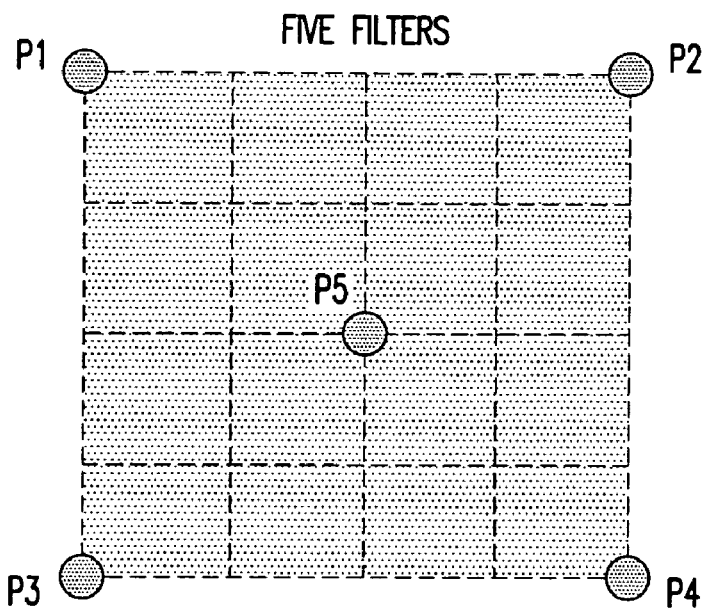
FIGS. 6A and 6B are diagrams illustrating both a five MMF approach and a nine MMF approach.
Figure 6B:
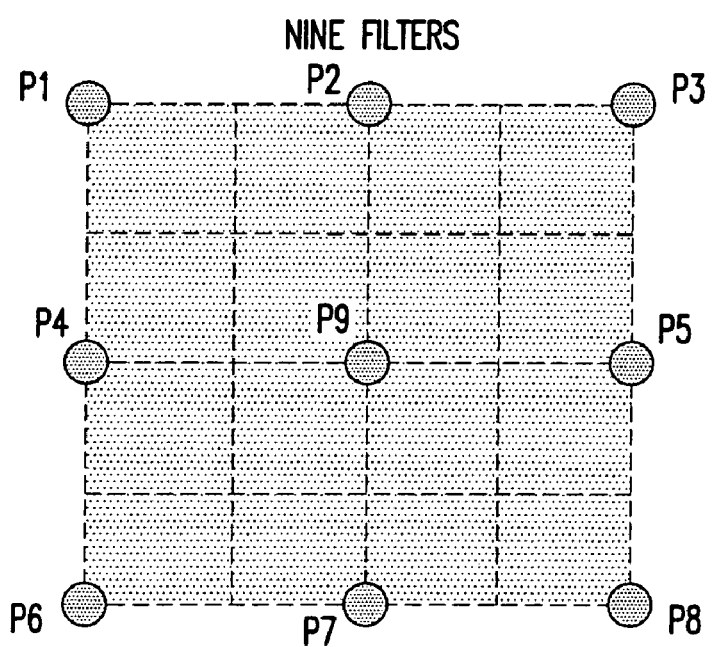

Instead of using a single MF, the present invention is directed to a multiple MF (MMF) method where the input image is filtered by MMFs, and the multiple filtered images are processed using a neighbor-fusion scheme to suppress random noise and to increase SCNR. The present invention includes both a five MMF approach and a nine MMF approach. As shown in FIG. 6, the phases of the five MMFs are the corner phases P1-P4 and the center phase P5, and the nine MMFs have four additional edge phases.

Figure 7:
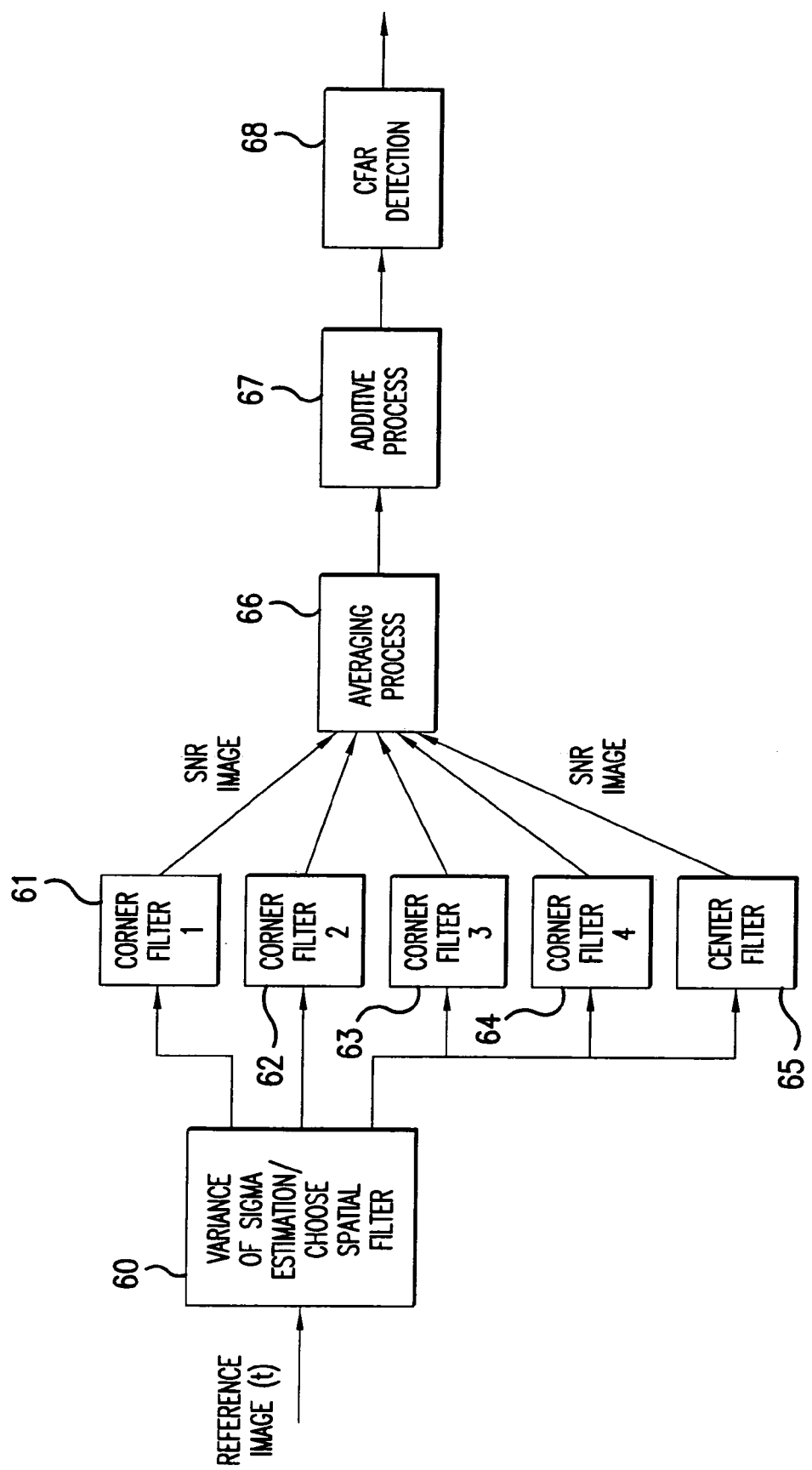
FIG. 7 is a block diagram of the five MMF detection process.

The block diagram of the five MMF detection process is illustrated in FIG. 7. A reference image (t) is processed in step 60 to estimate a variance of sigma and to chose a spatial filter 61-65. The "averaging process" step 66 in FIG. 7 is the core function that averages the four corner phasing filter outputs at different pixel locations. This function can reduce spatial random noise standard deviation (sigma) by half without reducing the target intensity at the corners. The next "additive process" step 67 then sums the detected intensities from all the filters 61-65 at the five phase locations (or nine phase locations in the nine MMF technique) before flowing to the "CFAR detection" step 68.

Averaging Process—Neighbor Fusion

As disclosed copending patent application Ser. No. 10/395,269 by Chen et al, entitled "Integrated Spatio-Temporal Multiple Sensor Fusion System Design", averaged fusion (equivalent to additive fusion) performs better than other fusion strategies such as MAX or MIN fusions. For example, the variance of a RV (random variable) can be reduced to one fourth of its original variance by averaging four of its events at different spaces or times.

As shown in FIG. 7, the inputs to the averaging process 66 are five SNR images. The original image is first filtered by use of the five MF's 61-65 of different phases to obtained five different spatial images. The five spatial images are then normalized (divided) by a background estimator to obtain five SNR images. It should be noted that the background normalization process is a nonlinear process.

Figures 1, 2A, 2B:
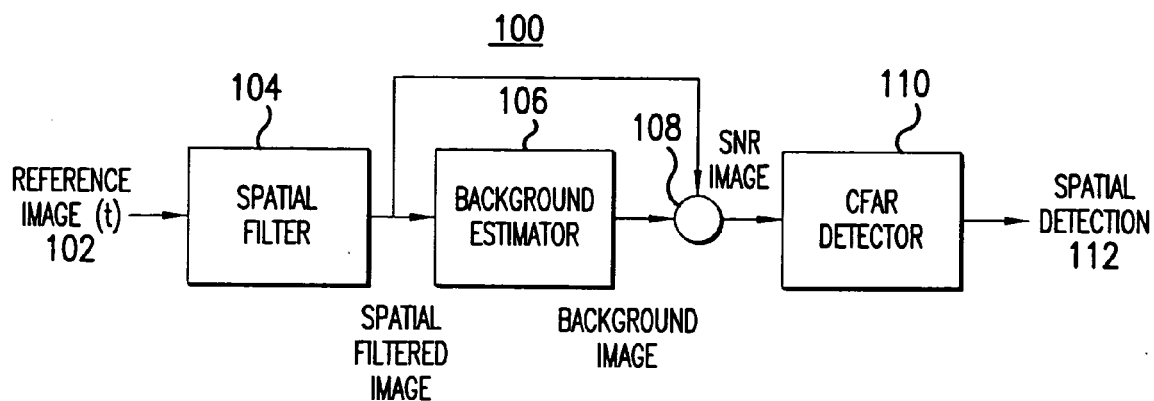
FIG. 1 illustrates an exemplary SMF (single matched filter) image processing system 100 found in the prior art.
FIGS. 2A and 2B are matrices which respectively represent a 3×3 DPSF of a pixel center phase, and a 3×3 DPSF of a pixel corner phase.
Figure 8:
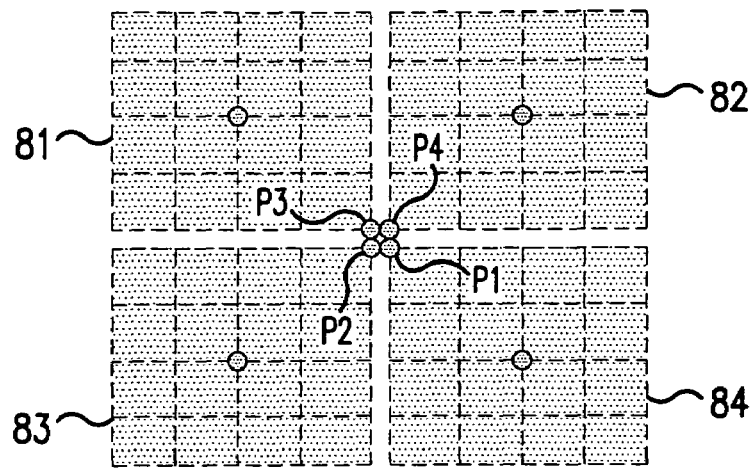
FIG. 8 is an illustration of the averaging process for the phase associated with an upper left corner.

As shown in FIG. 2(b) and FIG. 8, for the sub-pixel phase P1 (left-upper corner phase), the point source target will have its energy equally distributed in the pixel 84 and its three neighbor pixels: the left pixel 83, the left-upper pixel 81, and the upper pixel 82. As shown in FIG. 8, for the left pixel 83, the energy can be optimally detected using the MF of phase P2 (right-upper phase). For the left-upper pixel 81 and the upper pixel 82, the energy can be optimally detected using the MF of phase P4 (right-lower phase) and phase P3 (left-lower phase), respectively.

The averaging process (Neighbor Fusion) is expressed as $$NbFn\_1(ii,jj)=[snr\_1(ii,jj)+snr\_2(ii,jj-1)+snr\_3(ii-1,jj)+snr\_4(ii-1,jj-1)]/4, \quad (1)$$

where snr_1(ii,jj) is the SNR image filtered using MF of phase 1, snr_2(ii,jj−1) is the SNR image filtered using MF of phase P2 with one pixel shift to the left, snr_3(ii−1,jj) is the SNR image filtered using MF of phase P3 with one pixel shift to the upper direction, and snr_4(ii−1,jj−1) is the SNR image filtered using MF of phase P2 with one pixel shift to the left and one pixel shift to the upper direction.

Similarly we can obtain neighbor fusion for the other three corner phases:

$$NbFn\_2(ii,jj)=[snr\_2(ii,jj)+snr\_1(ii,jj+1)+snr\_4(ii-1,jj)+snr\_3(ii-1,jj+1)]/4, \quad (2)$$

$$NbFn\_3(ii,jj)=[snr3(ii,jj)+snr\_4(ii,jj-1)+snr\_1(ii+1,jj)+snr\_2(ii+1,jj-1)]/4. \quad (3)$$

and $$NbFn\_4(ii,jj)=[snr\_4(ii,jj)+snr\_3(ii,jj+1)+snr\_2(ii+1,jj)+snr\_1(ii+1,jj+1)]/4. \quad (4)$$

Figure 9:
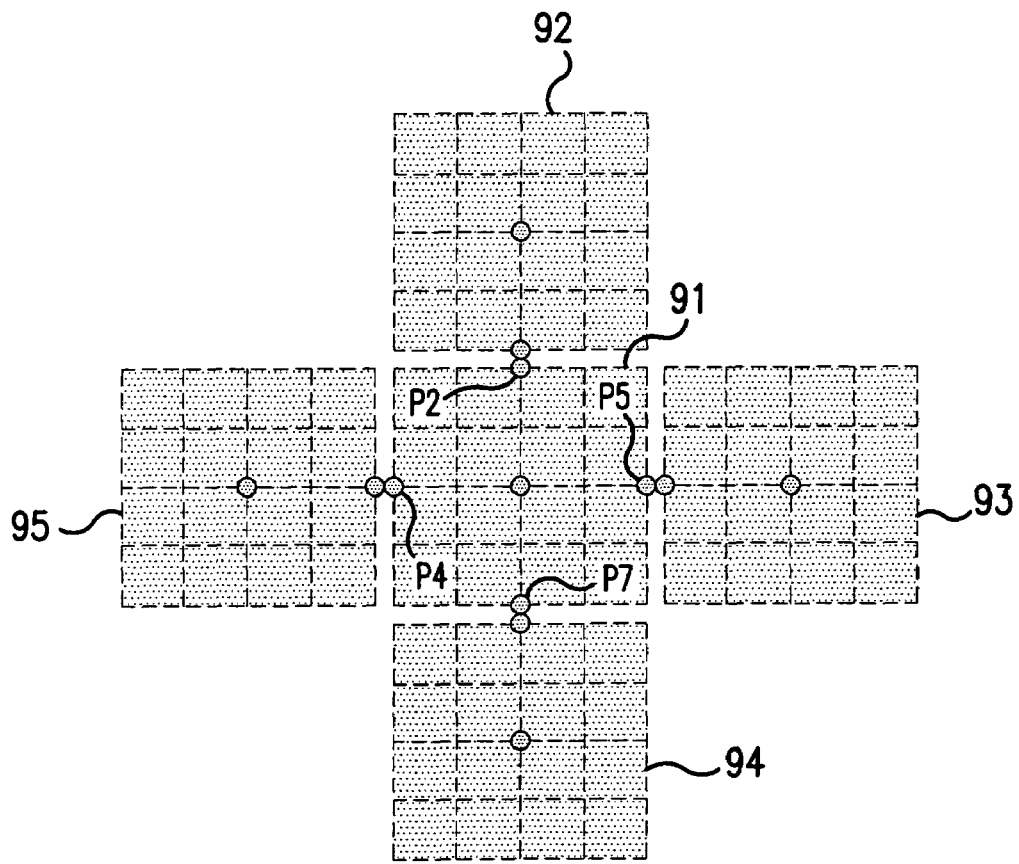
FIG. 9 is an illustration of the averaging process for the nine MMF Method.

For the nine MMF method of FIG. 9, there are four additional MF's of edge phases: phase P2 (upper-edge phase), phase 4 (left-edge phase), phase P5 (right-edge phase), and phase P7 (lower-edge phase). The averaging process (Neighbor Fusion) is expressed as $$NbFn\_4(ii,jj)=[snr\_4(ii,jj)+snr\_5(ii,jj-1)]/2, \quad (5)$$

$$NbFn\_5(ii,jj)=[snr\_5(ii,jj)+snr\_5(ii,jj+1)]/2, \quad (6)$$

$$NbFn\_2(ii,jj)=[snr\_2(ii,jj)+snr\_7(ii-1,jj)]/2, \quad (7)$$

and $$NbFn\_7(ii,jj)=[snr\_7(ii,jj)+snr\_2(ii+1,jj)]/2. \quad (8)$$

An Alternative Way of Averaging Process (Neighbor Fusion)

Since the spatial MF process and the averaging process are both linear processes, an alternative averaging process is to first average the four MFs with corner phases with appropriate pixel shifts. The resulting averaged MF is of a larger size. The original MF's have a size of 3×3. The averaged MF will have a size of 5×5. The four 5×5 averaged MFs are then used to filter the original image to obtain four different spatial images. They are then normalized by a background estimator to obtain four SNR images. Similarly, for the nine-MMF method, the edge MFs can be averaged to a larger 3×5 or 5×3 MF depending on its edge locations.

Modification of SNR Image Processed by MF of Center Phase

It is desirable for the output of the MF with a center phase to be large, when the point source target phase is near the pixel center. On the other hand, it is desirable that its output be small when the point source target phase is near the pixel corners. It has been observed that the values of the eight surrounding pixels are quite random with positive and negative values when the target phase is close to the center, and most of the 8 surrounding values are relatively large positive values, when the target phase is close to the corners. Based on this observation, the SNR image processed by the MF of center phase is modified.

For the five-MMF method, $$NbFn\_5(ii,jj)=snr\_5(ii,jj)-Residue, \quad (9)$$

where Residue=Sum(8 surrounding pixels)/8.

For the nine-MMF method, $$NbFn\_9(ii,jj)=snr\_9(ii,jj)-Residue, \quad (10)$$

where Residue=Sum(8 surrounding pixels)/8.

Last Stage—Additive Process

All the neighbor-fused images are then added up as the sum of all the detection intensities. The resulting image is called neighbor-fused SNR image.

For the five-MMF method, $$\text{snr\_NbFn}(ii, jj) = \sum_{k=1}^{5} \text{NbFn\_k}(ii, jj). \quad (11)$$

For the nine-MMF method, $$\text{snr\_NbFn}(ii, jj) = \sum_{k=1}^{9} \text{NbFn\_k}(ii, jj). \quad (12)$$

The obtained neighbor-fused SNR image goes to the traditional CFAR process to report detections for a specific false detection rate Pfa, or go to a multiple thresholding process to generate ROC curves to evaluate the performance of the algorithms.

Airborne IR Sensor Clouds Background Clutter

Figure 10B:
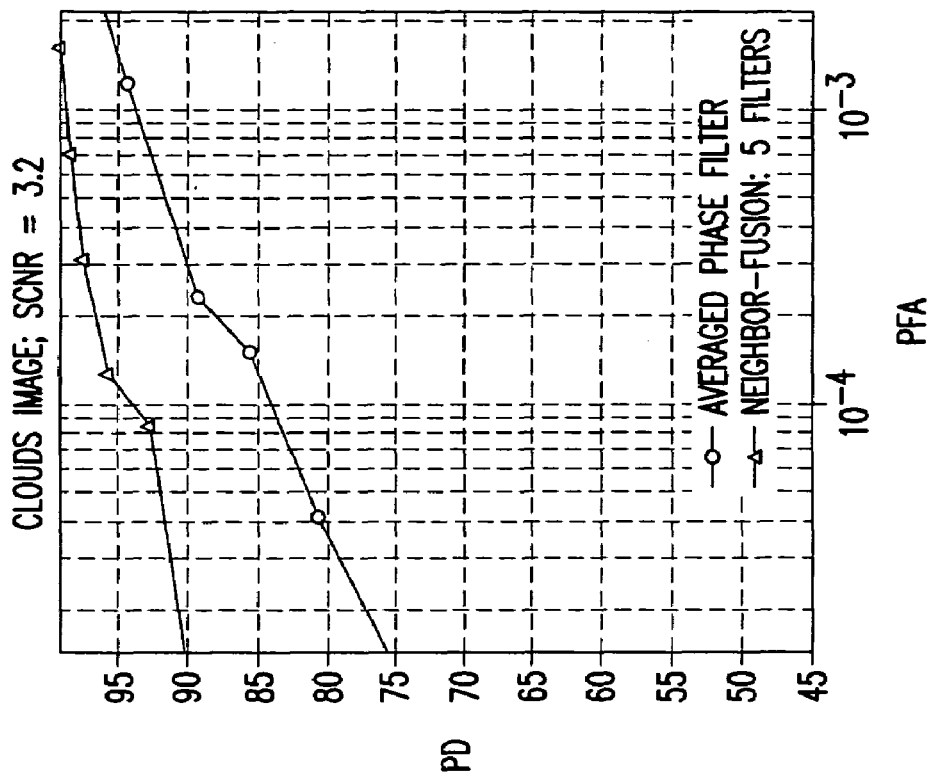
FIGS. 10A and 10B are graphs that show detection performance comparisons between the five-MMF method (dashed curve with triangles) and the traditional single MF method using the averaged phase filter (solid curve with circles).
Figure 10A:
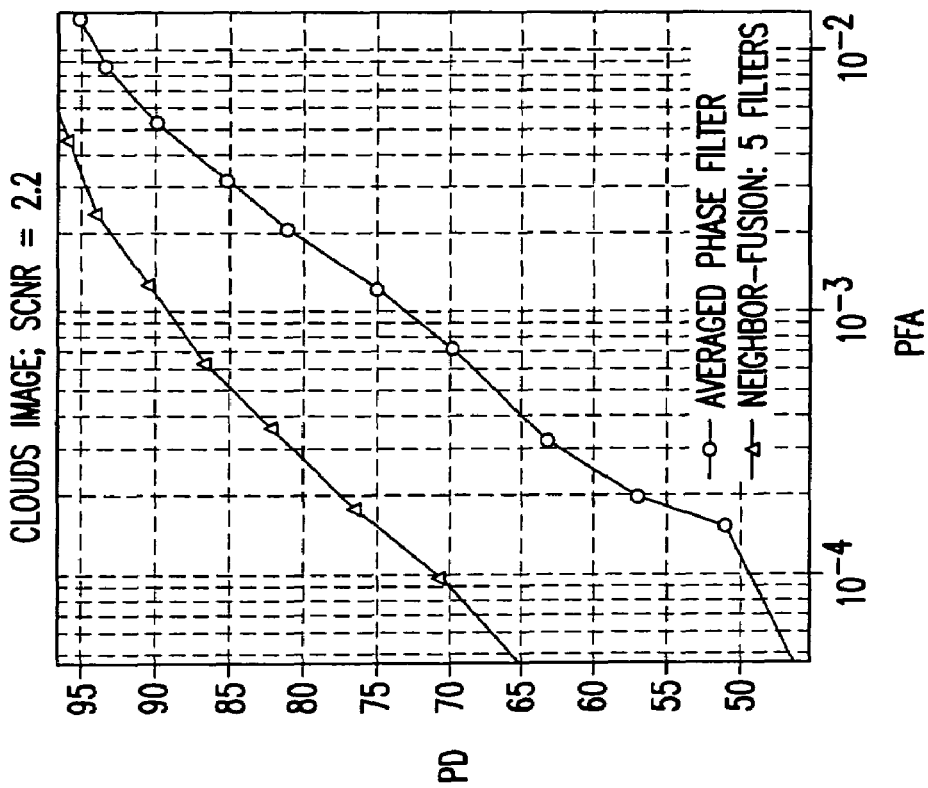

FIGS. 10A and 10B show detection performance comparison between the five-MMF method (dashed curve with triangles) and the traditional single MF method using the averaged phase filter (solid curve with circles) at SCNR=2.2 (FIG. 10(a)) and at SCNR=3.2 (FIG. 10(b)). It is seen that detection performance is much improved by use of the five-MMF method. The Pfa is reduced by about 7~10 times.

Figure 11B:
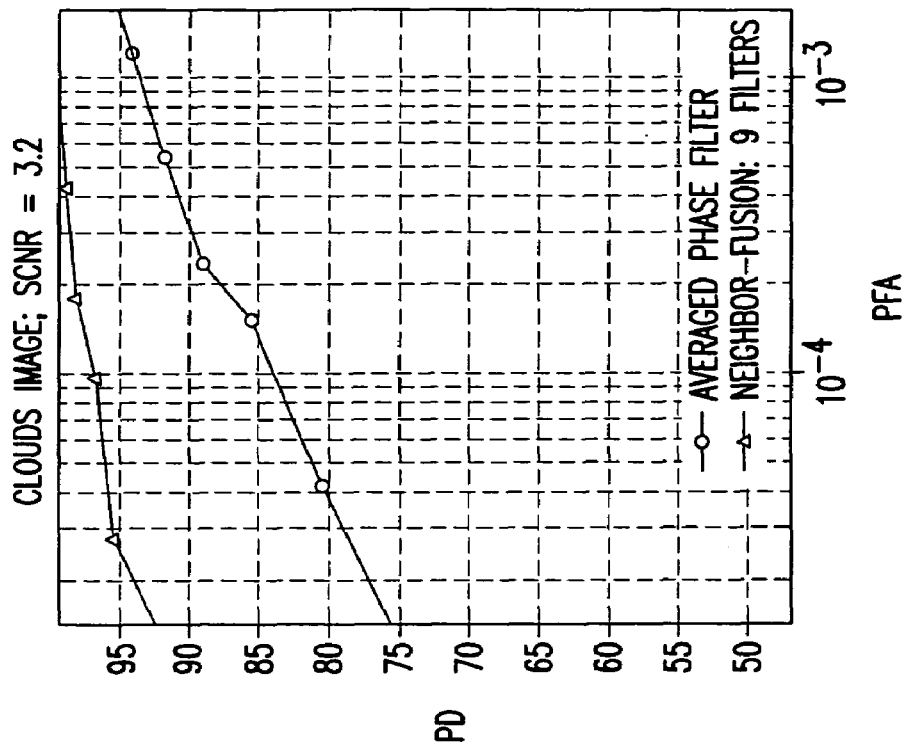
FIGS. 11A and 11B are graphs that show detection performance comparisons between the nine-MMF method (dashed curve with triangles) and the traditional single MF method using the averaged phase filter (solid curve with circles).
Figure 11A:
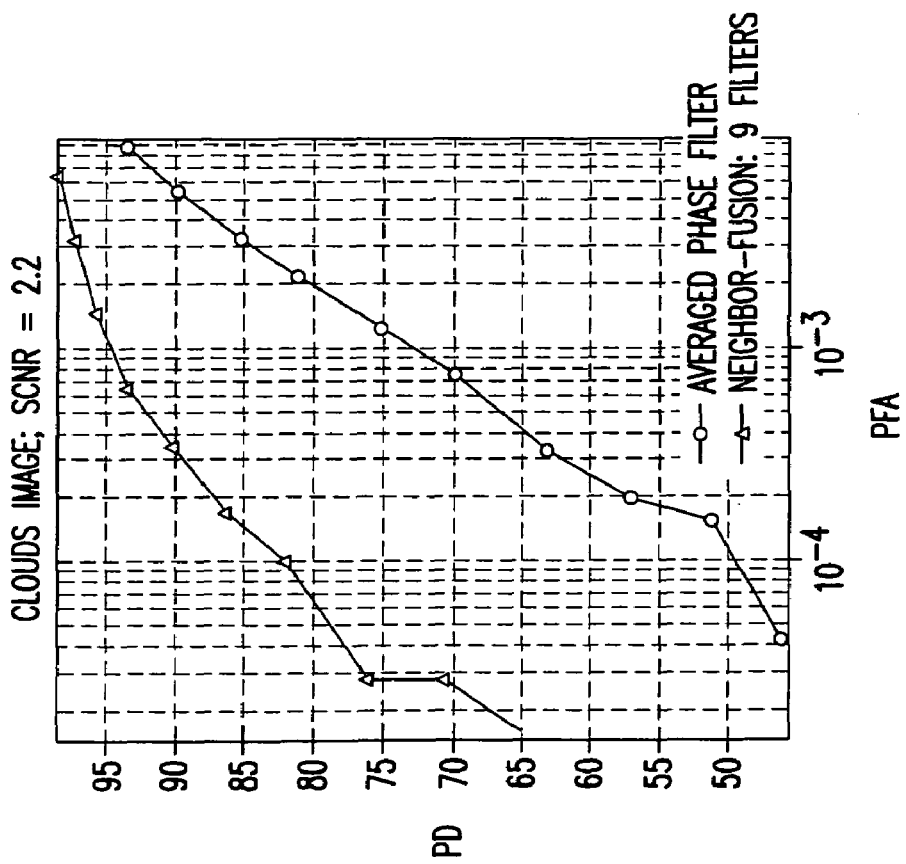

FIGS. 11A and 11B show detection performance comparisons between the nine-MMF method (dashed curve with triangles) and the traditional single MF method using the averaged phase filter (solid curve with circles) at SCNR=2.2 (FIG. 11(a)) and at SCNR=3.2 (FIG. 11(b)). It is seen that detection performance is much improved by use of the nine-MMF method. The Pfa is reduced by about 20~30 times. That is, with 4 additional MFs of edge phases, the Pfa is further reduced by about 3 times, compared with the results using the five-MMF method.

Satellite IR Sensor Clouds Background Clutter

Figure 12:
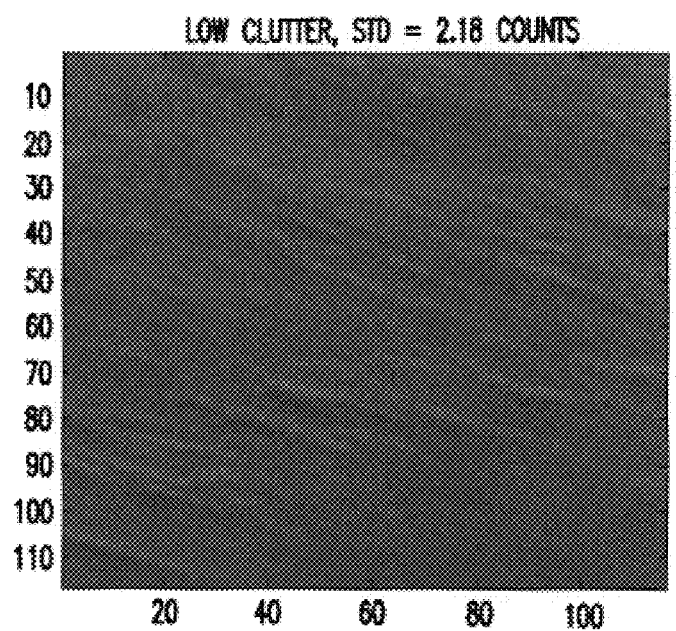
FIG. 12 shows a relatively low clutter scene in a satellite image.
Figure 13:
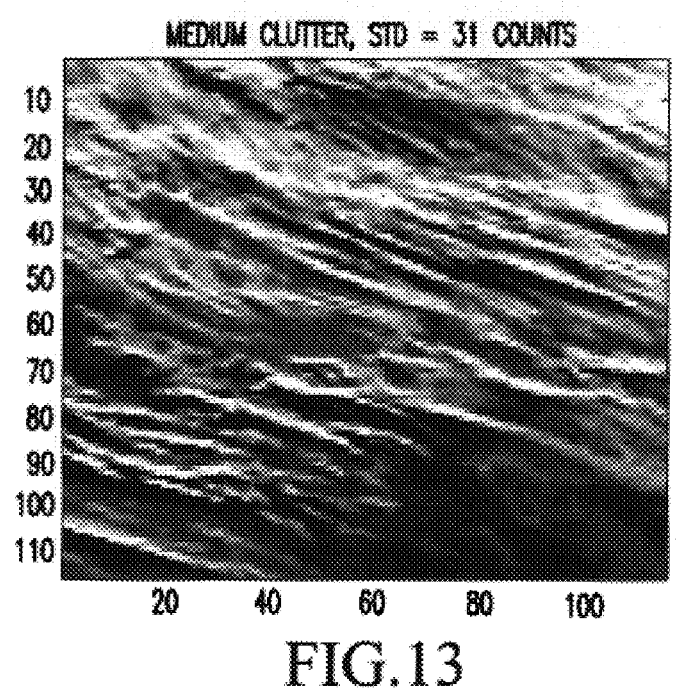
FIG. 13 shows a relatively medium/heavy clutter scene in a satellite image.

A low clutter and a medium/heavy clutter scene of satellite images are shown in FIGS. 12 and 13, respectively. The STD (standard deviation) of the medium/heavy clutter is almost 15 times as large as the STD of the low clutter (the medium/heavy clutter in the satellite image is similar to heavy clutter in airborne sensor images). The MMF method of the present invention is most efficient for improving detection for low and medium background clutter where random noise contributes as well as the correlated clutter noise. For example, the clouds scene in FIG. 3 is considered as a medium clutter for airborne IR sensors.

Figure 14:
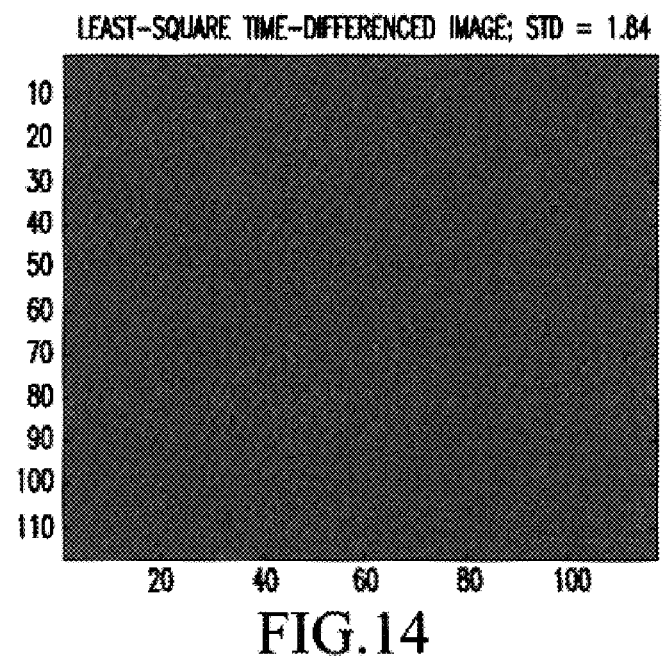
FIG. 14 shows the residual image after LS time-differencing from the medium/heavy clouds clutter shown in FIG. 13.

The medium/heavy clutter shown in FIG. 13 is dominated by spatially correlated clutter noise. For this kind of images, we first apply an LS (least-square) time-differencing process of the type described in M. Fernandez, A. Aridgides, D. Randolph, and D. Ferris, "Optimal Subpixel-Level IR Frame-to-Frame Registration," *SPIE Proceedings of Signal and Data Processing of Small Targets*, vol. 1481, pp. 172-179, 1991. This technique reduces most of the correlated clutter, and the MMF method is applied to further improve detection performance. FIG. 14 shows the residual image after the LS time-differencing (using a 5×5 correlated filter)

from the medium/heavy clouds clutter shown in FIG. 13. The clutter STD is significantly reduced from 31 counts to 1.84 counts.

Figure 15:
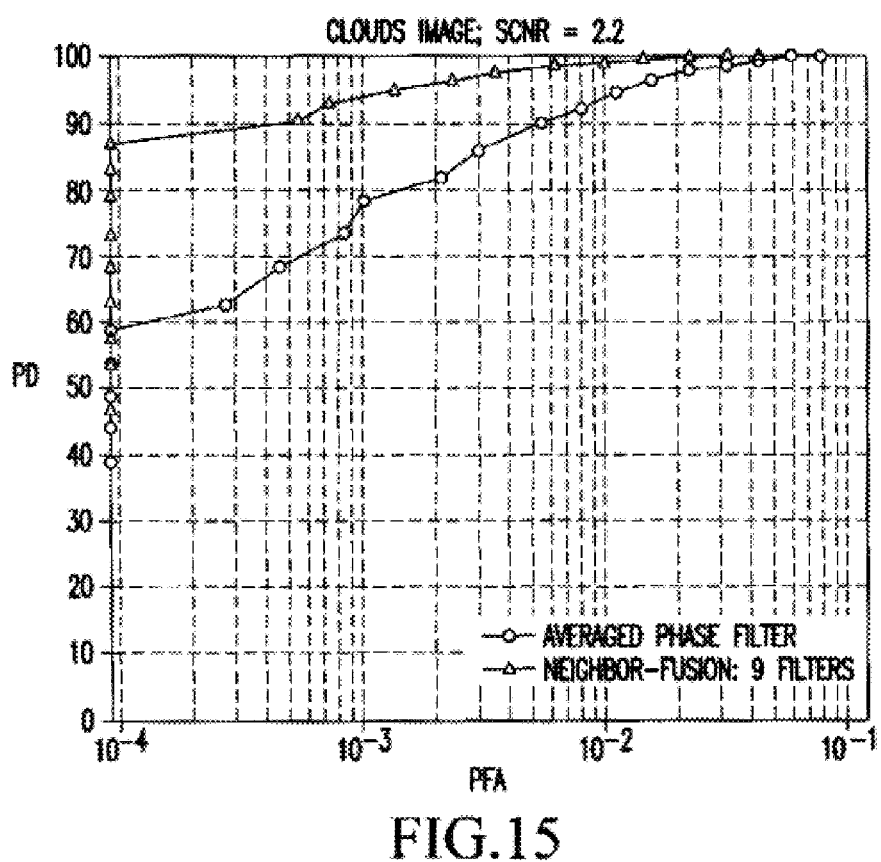
FIG. 15 is a graph showing ROC curve comparisons for a low clutter scene.

FIG. 15 shows detection performance comparison between the nine-MMF method (dashed curve with triangles) and the traditional single MF method using the averaged phase filter (solid curve with circles) at SCNR=2.2 for the low clutter background shown in FIG. 12. It is seen that detection performance is much improved by use of the nine-MMF method. The Pfa is reduced by more than 10 times.

Figure 16:
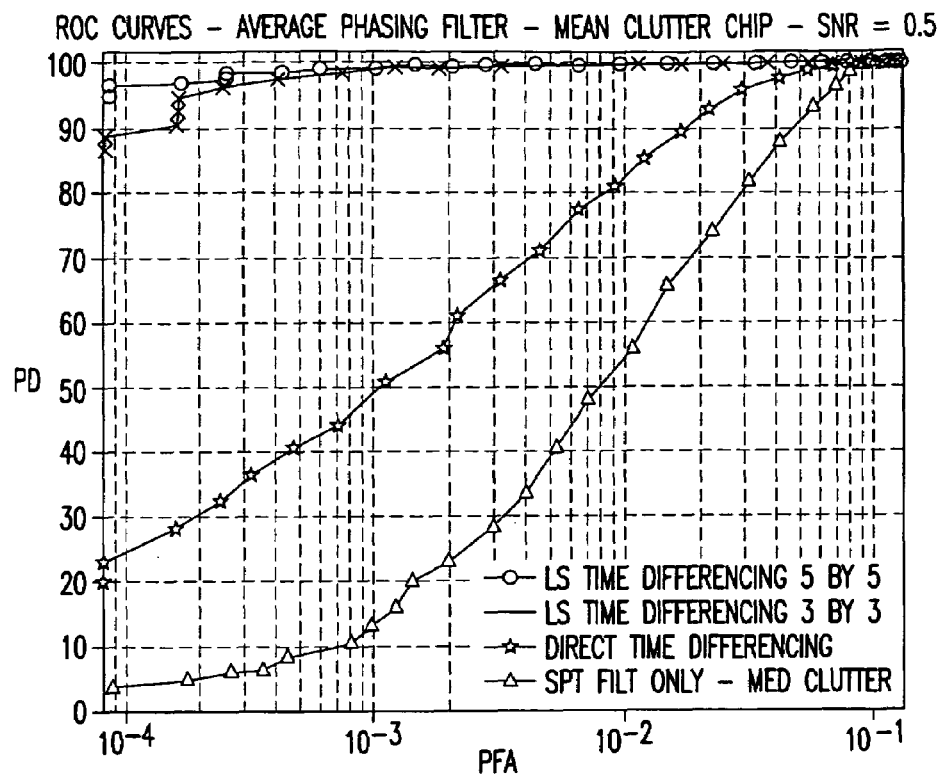
FIG. 16 is a graph showing ROC curve comparisons: before and after LS time-differencing.

FIG. 16 shows detection performance comparison before and after LS time-differencing, and also shows the performance of direct time-differencing without using LS process. The background clutter used is the one shown in FIG. 13. The curve with 'triangle' symbols in FIG. 16 shows the detection performance on the original clutter image (before time-differencing). The target intensity relative to the original clutter STD is SCNR=0.5. The other three curves in FIG. 16 also used the same target intensity. The curve with 'star' symbols in FIG. 16 shows the detection performance of direct time-differencing (direct subtraction between the current frame and the previous frame without using LS correlation process. It is seen that direct time-differencing performs better than no time-differencing.

The curves with 'circle' symbols and 'cross' symbols in FIG. 16 show the detection performance of LS time-differencing using a 5×5 and a 3×3 correlation filters, respectively. The 5×5 filter performs a little better. It is seen that LS time-differencing performs much better than no time-differencing. The Pfa is reduced by more than 100 times. All the four curves in FIG. 15 are performances using the traditional single MF method with the averaged phase filter. In FIG. 16, we will show that by applying the nine-MMF method we can further reduce the Pfa by another factor of 30 times, so that the total false alarms reduction is about 3,000 times.

Figure 17:
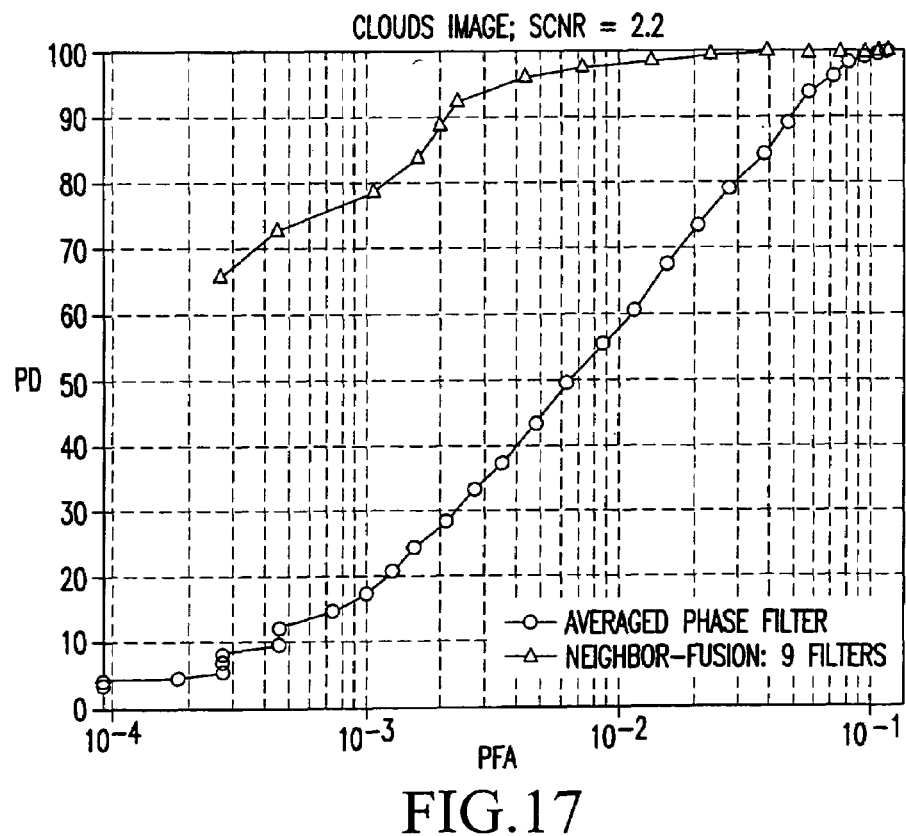
FIG. 17 is a graph showing ROC curve comparisons for the residual image after time-differencing.

FIG. 17 shows detection performance comparison between the nine-MMF method (dashed curve with triangles) and the traditional single MF method using the averaged phase filter (solid curve with circles) at SCNR=2.2 for the residual clutter background (after LS time-differencing) shown in FIG. 14. It is seen that detection performance is much improved by use of the nine-MMF method. The Pfa is reduced by about 30 times. Note that the SCNR (=2.2) is relative to the residual clutter (STD=1.84). If we convert the target intensity relative to the original clutter (STD=31), the SCNR is 0.13. It is a very low SCNR, but a relatively good detection performance can be obtained by combining the LS time-differencing and MMF method as shown in FIG. 17.

It should be noted that the MMF (Multiple Matched Filters) approach can significantly reduce the Pfa for a specific Pd, or can significantly increase Pd for a specific Pfa. For example, as shown in FIG. 11(a), for a Pfa=1 E−4, Pd is increased from 50% to 82%.

Since the MF size is small (3×3), the processing time for MMF method is still fast enough. For example, for the five-MMF method, the processing time required for spatial processing the five multiple MFs is less than that required for a single MF process with a larger filter size of 7×7.

It should be also be noted that the nine MMF method performs better than the five MMF method. Therefore, the MMF method can be further improved by adding more MFs with edge phases.

Effort in developing the MMF method has a especially beneficial effect, since the outputs from MMF can be further used for improving sub-pixel centroiding performance. For a low/medium SCNR, the centroiding errors can be reduced by a factor of 40%, and for a high SCNR, the centroiding errors can be further reduced by more than 50%.

In general, the performance for heavy clutter is worse than that for low clutter, even though time-differencing techniques are applied. This is because the time-differencing process will cause a 40% increase of random noise Sigma. The present has shown that by combining time-differencing techniques with the MMF method, the Pfa caused by both the correlated clutter and random noise can be significantly reduced, and thus the performance for heavy clutter will be close to that for low clutter.

The random phasing of unresolved targets falling onto an IR FPA pixel will cause reduced detection performance, and this problem is universal to all systems that use IR FPAs as sensor detectors. Therefore, the present invention has wide applicability to many different systems.

What is claimed is:

1. A method for detecting a point source target using multiple matched filters, comprising the steps of:
   receiving image data from a sensor having a plurality of pixels;
   processing the image data from a selected pixel corresponding to a potential point source target and from a plurality of pixels neighboring the selected pixel;
   selecting a plurality of spatial filters having a plurality of different phases, including at least a center phase and four corner phases;
   filtering the image data with the selected spatial filters to obtain different filtered spatial images; and
   detecting a target based upon the filtered spatial images.

2. A method according to claim 1 wherein at least five spatial filters are selected.

3. A method according to claim 1 wherein at least nine spatial filters are selected.

4. A method according to claim 3 wherein the spatial filters include at least four edge phases.

5. A method according to claim 1 which further includes the step of normalizing the filtered image data by dividing the filtered image data with a background estimation.

6. A method according to claim 5 which further includes the step of averaging the filtered spatial images.

7. A method according to claim 6 which further includes the step of summing the intensities of the filtered spatial images.

8. A method according to claim 6 wherein the averaging includes an average of the four corner phasing filter outputs at different pixel locations.

9. A method according to claim 6 wherein the averaging includes an average of the four corner phasing filter outputs with at least a one pixel shift.

10. A method according to claim 1 wherein the detecting step includes a constant false alarm rate detection.

11. A method according to claim 1 wherein the detecting step includes a multiple thresholding technique.

12. A method according to claim 1 wherein a least square time-differencing process is applied to the image data prior to filtering.

13. A system for detecting a point source target using multiple matched filters, comprising the steps of:
   a sensor having a plurality of pixels for providing image data;
   a processor for processing the image data from a selected pixel corresponding to a potential point source target and from a plurality of pixels neighboring the selected pixel;
   a plurality of spatial filters having a plurality of different phases, including at least a center phase and four corner phases, said spatial filters filtering the image data to obtain different filtered spatial images; and a detector for detecting a target based upon the spatially filtered images.

14. A system according to claim 13 wherein at least five spatial filters are utilized.

15. A system according to claim 13 wherein at least nine spatial filters are utilized.

16. A method according to claim 13 wherein the spatial filters include at least four edge phases.

17. A system according to claim 13 wherein the filtered image data that is normalized with an estimator that divides the filtered image data with a background estimation.

18. A system according to claim 17 wherein the filtered spatial images are averaged.

19. A system according to claim 18 wherein the intensities of the filtered spatial images are summed.

20. A system according to claim 13 wherein the detector includes a constant false alarm rate detector.

21. A system according to claim 13 wherein the detector includes multiple thresholds.

22. A system according to claim 13 wherein the sensor includes an infrared focal plane array.

* * * * *